Feb. 17, 1942.　　　O. STEINER　　　2,273,386
MIRROR AND DIAPHRAGM RELEASE MEANS FOR REFLEX CAMERAS
Original Filed Jan. 12, 1940　　　5 Sheets-Sheet 1
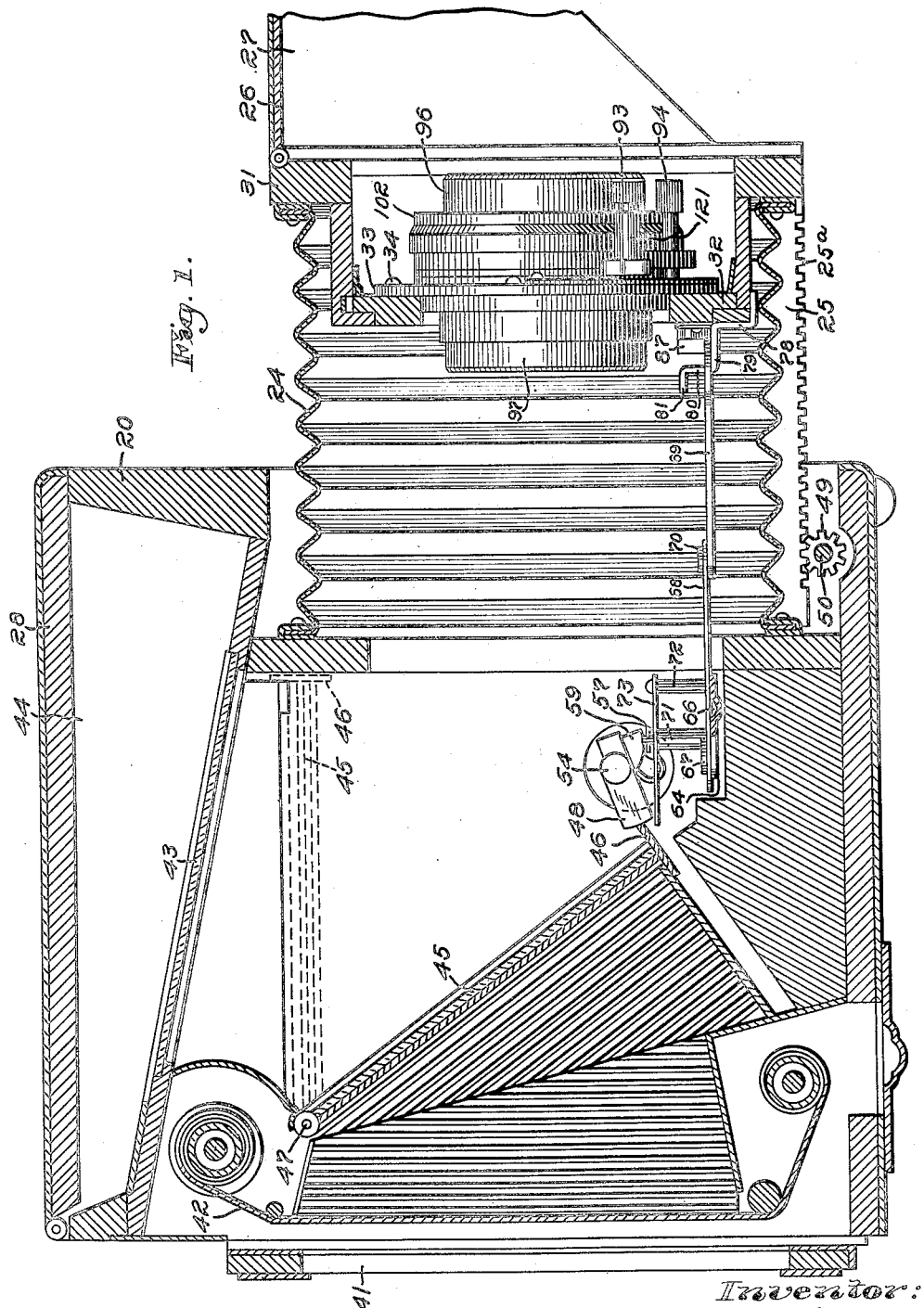
Inventor:
Oscar Steiner, Feb. 17, 1942.  O. STEINER  2,273,386
MIRROR AND DIAPHRAGM RELEASE MEANS FOR REFLEX CAMERAS
Original Filed Jan. 12, 1940  5 Sheets-Sheet 2
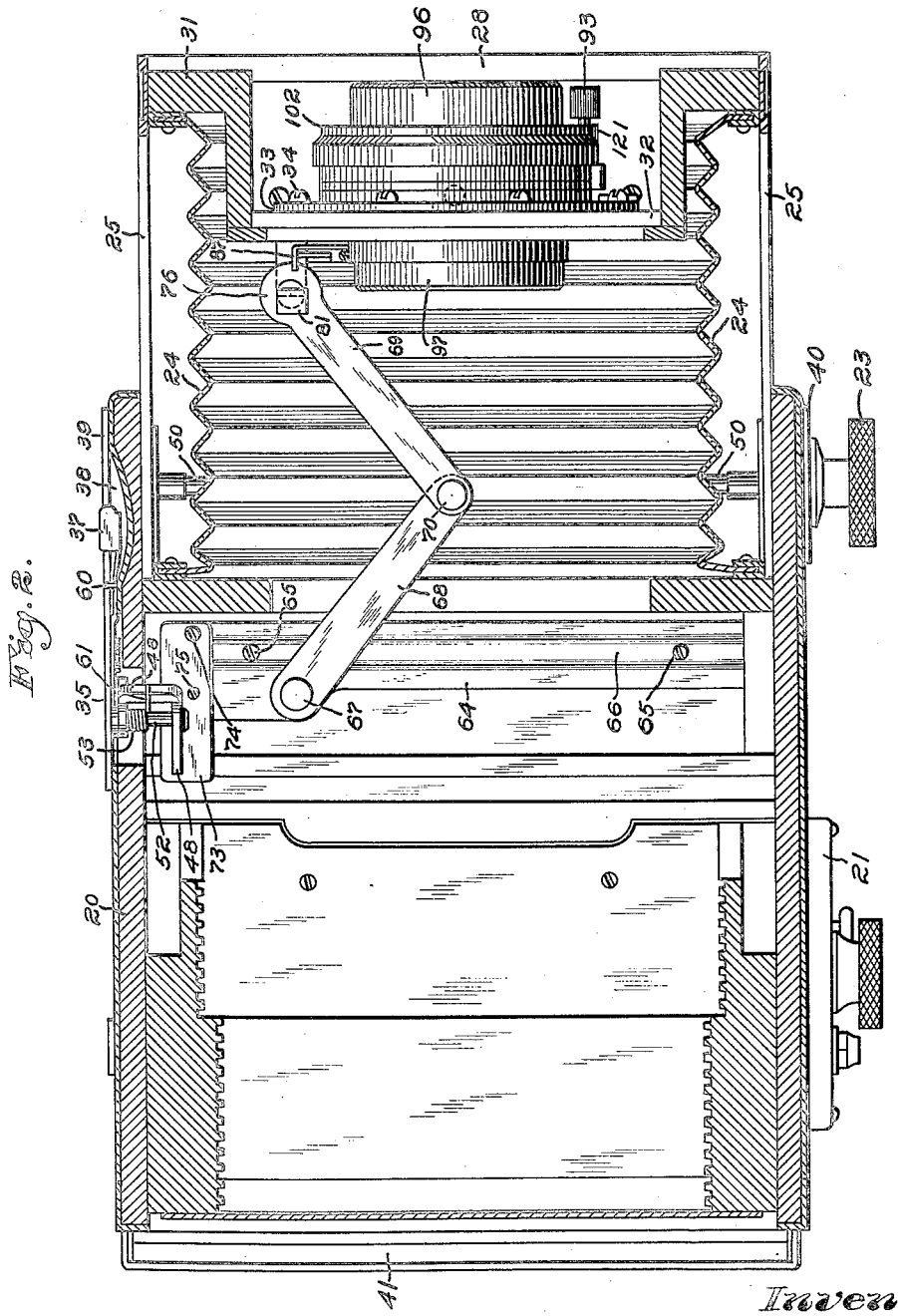
Inventor:
Oscar Steiner,

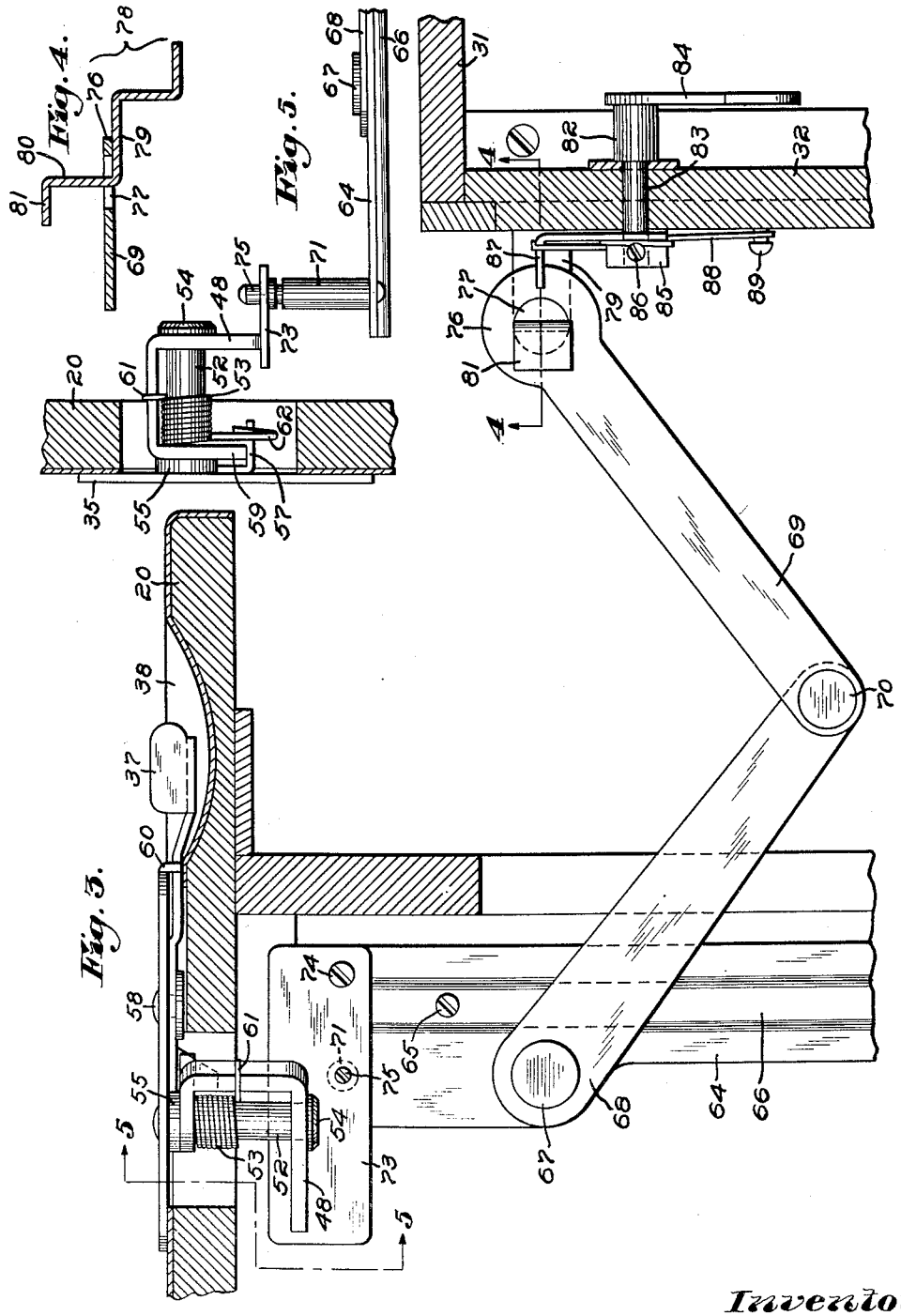

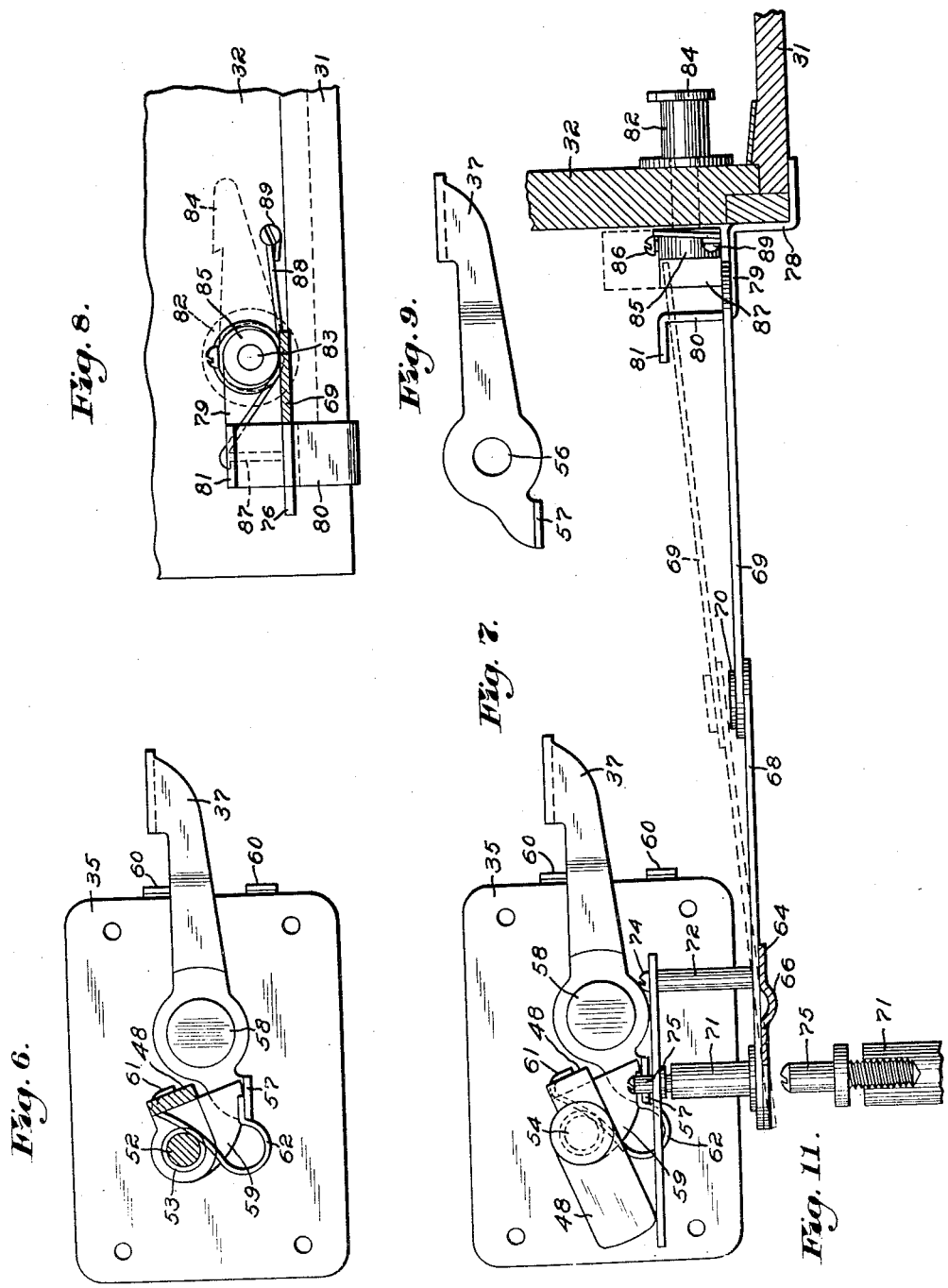

Patented Feb. 17, 1942

2,273,386

UNITED STATES PATENT OFFICE 2,273,386

MIRROR AND DIAPHRAGM RELEASE MEANS FOR REFLEX CAMERAS

Oscar Steiner, Irondequoit, N. Y., assignor to The Folmer Graflex Corporation, Rochester, N. Y., a corporation of Delaware Original application January 12, 1940, Serial No. 313,534, now Patent No. 2,236,925, dated April 1, 1941. Divided and this application February 1, 1941, Serial No. 377,035

21 Claims. (Cl. 95—42)

This application is a Patent Office-required division of my co-pending application Ser. No. 313,534, filed January 12, 1940, now Patent No. 2,236,925, dated April 1, 1941.

This invention relates to mirror and diaphragm release means for cameras of the reflex or reflecting type.

In order that the principle of the invention may be readily understood, I have disclosed a single embodiment thereof in the accompanying drawings, wherein—

Fig. 1 is a longitudinal, vertical section through a reflex camera, showing the coupling means between the mirror-release lever and the automatic diaphragm releasing mechanism;

Fig. 2 is a longitudinal, transverse section through the camera, showing the manner of maintaining the coupling means between the mirror-release lever and the automatic diaphragm control, even though the lens position be changed with respect to the focal plane;

Fig. 3 is a partial transverse section on an enlarged scale showing the diaphragm operating means coupled to the mirror-release lever;

Fig. 4 is a sectional detail on the line 4—4 of Fig. 3;

Fig. 5 is a section on the line 5—5 of Fig. 3, showing the mounting of the mirror-release lever and the connection to the automatic diaphragm operating means;

Fig. 6 is a detail, mainly in elevation, of the mirror-release lever operating plate as viewed from the interior of the camera;

Fig. 7 is a view similar to Fig. 6, but showing also the coupling means between the mirror-release lever and the automatic diaphragm control means;

Fig. 8 is a fragmentary rear view, partly in section, of the camera front box, showing the mounting of the automatic diaphragm-release pawl;

Fig. 9 is a side elevation of the mirror-release lever;

Fig. 11 is a sectional detail of a part shown in Fig. 7.

Figure 10:
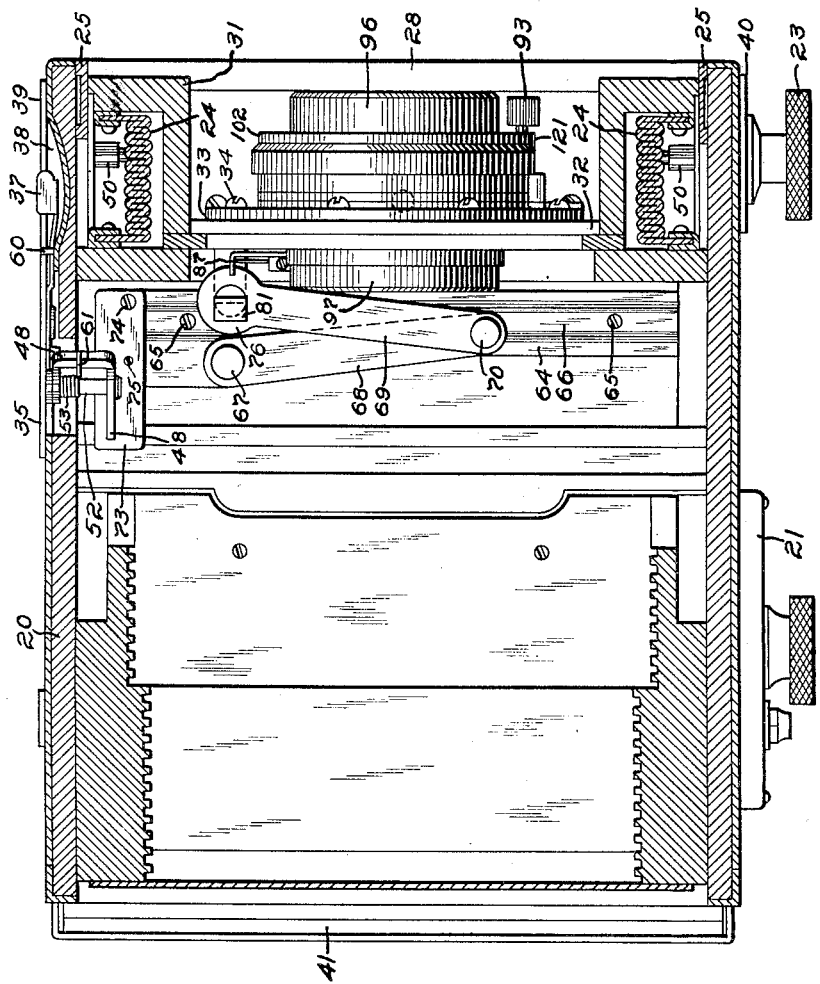
Fig. 10 is a horizontal, longitudinal section through the camera, showing the lens moved back in the direction of the focal plane, and showing the construction of the collapsible automatic diaphragm operating lever.

It is well known to the users of single-lens reflex cameras that it would be a decided advantage to focus with the diaphragm wide open, thereby having available a greater quantity of light on the ground glass than would be had if the diaphragm were stopped down to that aperture at which the picture was to be made. Assuming, for example, that the operator is desirous of making an exposure at f11,—as a rule, insufficient light would reach the ground glass focusing screen to focus the camera accurately. However, if the diaphragm were open, say to f4.5, adequate light would be had. But in making these changes manually, the operator often forgets or does not have the time to adjust the diaphragm to its proper setting after focusing. I herein disclose automatic means for doing this, providing means whereby the diaphragm of the lens is set at the full open position and a preselected stop is chosen and adjustment made accordingly. At the instant of making the exposure, the diaphragm operating mechanism is released automatically, closing down the diaphragm to that preselected opening without any thought on the part of the operator.

There have been several attempts to provide means for accomplishing this result. The mechanism disclosed in the patent to Torkel Korling No. 2,029,238, dated January 28, 1936, is so far as I am aware the nearest approach in the prior art to a satisfactory solution of this problem.

To have a satisfactorily operating automatic diaphragm stop, it is necessary that it work not only on one particular lens but on any lens that may be chosen to be used with the camera, and it is very desirable that no adjustment be made on any of the operating mechanism other than the changing of the lens in the usual manner. In the present disclosure, this is taken care of, and any lens, if provided with automatic diaphragm adjusting means, is, in the practice of my invention, instantly coupled with the operating mechanism when that lens is inserted in the camera.

Preferably lenses and lens boards can readily be changed without in any way making adjustments of or in the diaphragm control means. The disclosure in the said Korling patent is confined to the use of one lens only, whereas in accordance with the present disclosure any number of lenses can be used interchangeably, provided the lens mounts are equipped with the automatic feature, and they can all be controlled from the mirror-release mechanism. As hereinafter fully disclosed, the mirror-release mechanism is so adjusted or constructed that the diaphragm-release takes place just prior to the release of the mirror, and if the operator of the camera so desires, the diaphragm only can be released by merely partially depressing the mirror-release lever. This is of advantage to the operator as it gives him an opportunity to check on the depth of focus when the lens is stopped down. However, the normal operation of the parts herein disclosed comprises the steps of (a) setting the mirror, (b) winding the shutter, (c) selecting the diaphragm stop position to be used, and (d) pressing the mirror-release all the way down, which act will (1) release the automatic diaphragm and (2) release the mirror which in turn trips the shutter.

This invention is more particularly directed to the provision of means for varying the timing action of the mirror release relative to the diaphragm release, which has never been accomplished prior to my inventions so far as I am aware.

Referring first to Figs. 1 and 2 of the drawings wherein a reflex or reflecting type of camera is shown, inasmuch as my invention is particularly adapted to the said type of camera, the camera box or casing is indicated at 20. The shutter mechanism plate is indicated at 21, the focusing knob at 23, the bellows at 24, the camera front side rails at 25, the lens shade top door at 26, and the lens shade wings at 27, 27.

The camera top door is indicated at 28, and the camera front is indicated at 31. The lens board is indicated at 32 and the lens flange is indicated at 33, it being attached to the lens board 32 by means of screw 34, 34. The mirror-release plate is indicated at 35, it being attached to the camera box or casing 20 by means of suitable screws. The mirror-release or mirror-operating lever is indicated at 37, and there is provided in the side of the camera box or casing 20 a cut-out or depression 38 providing clearance for the operation of the said lever 37. One suitable focusing pinion bearing 39 is attached to the camera box or casing 20 by means of suitable screws. The right hand focusing pinion bearing is indicated at 40, it being attached to the right hand side of the camera box or casing 20 by means of suitable screws. The camera back is indicated at 41, it being attached to the camera box or casing 20 by means of suitable screws. The foregoing parts may be of any suitable construction, and except as hereinafter set forth, they do not constitute novel features of my invention.

In Fig. 1 is shown a typical construction of a reflex or reflecting camera to which this invention is particularly adapted. Reflex or reflecting cameras are constructed in several well known forms, and the particular type of camera herein illustrated has been chosen from among the said well known forms as one means or example for affording the illustration of the automatic diaphragm control to which my invention particularly relates. My invention will be described as applied to the particular type of reflex camera herein shown, but it is to be understood that my invention is not limited to use only with such disclosed type.

Still referring particularly to Fig. 1, the curtain of the focal plane shutter of the usual type is indicated at 42, and is so well known as not to require further description herein. The ground glass focusing screen is indicated at 43. The hood used with this type of camera is positioned in the space indicated at 44, but the hood has been omitted from said figure in order to permit a more clear showing of the construction of the camera.

The reflecting mirror itself is indicated at 45, it being carried by a mirror frame 46 pivoted on a shaft 47, the said mirror being held in the position shown in Fig. 1 by a latch 48. The said mirror frame 46 is provided with spring means to cause it to travel to the position shown in dotted lines in said figure, when the latch 48 clears the mirror frame 46. The said spring means may be any well known or suitable tensioning means.

The focusing means is very clearly shown in Fig. 1. For effecting focusing, the side rails 25 are provided with gear teeth 25a meshing with pinions 49 attached to a shaft 50, most clearly shown in Fig. 2. The said shaft passes through the bearing plates 39, 40, and has attached thereto the focusing knob 23, previously referred to. The said knob 23 and the pinions 49, 49 are attached to the shaft 50 in any well known manner, as, for example, by taper pins. Any movement of the focusing knob 23 will be transmitted through the pinions 49, 49, and the rack teeth 25a of the side rails 25 will cause a like movement of the camera front 31, which is attached to the side rails 25 by means of suitable screws, thus providing ready means for focusing.

The said camera front 31 is made up of a box-like structure provided with an opening at the rear end to receive the lens board 32, which is attached to the said camera front 31 and is held in place in a manner so well known as to need no further description herein.

The mirror-holding and the releasing latch 48 is caused to be moved in the proper direction to retain the mirror frame 46, namely, in the position shown in Fig. 1, by means of a coiled spring 53, shown in Fig. 2 and elsewhere. The structure of the said holding and releasing latch 48 is most clearly shown in Figs. 2, 3 and 5. As shown in Figs. 3 and 5, the said latch 48 is a U-shaped structure having holes through which passes the shaft or pin 52, which is provided with a head 54 and a spacing washer 55.

Also attached to the mirror-release plate 35 (Fig. 1) is the said mirror-release or operating lever 37, shown in detail in Fig. 9. The said lever 37 is, as there shown, provided with a hole 56 and an upturned end 57. The said mirror-release or operating lever 37 is attached to the plate 35 by means of a shoulder rivet 58, shown in Figs. 6 and 7. The said mirror latch 48 is provided with a cam shaped arm 59 which is parallel with the other arm of the said U-shaped structure. The said arm 59 is engaged by the upturned end 57 of the lever 37 when said lever 37 is depressed for making an exposure. This structure is most clearly shown in Fig. 6.

The mirror-release plate 35 (Fig. 2) is provided with upturned lugs or bosses 60, 60, which limit the movement of the said lever 37. The said coiled spring 53 is provided with a hooked end 61, best shown in Figs. 3 and 5, and which overlies the arms-connecting portion of the said U-shaped latch 48, and is also provided on the opposite end with a circular loop 62, shown in Fig. 5 as having a bent-over end which overlies the bent-up portion 57 of said mirror-release or operating lever 37.

The action of the spring 53 is such that the mirror-release or operating lever 37 will be caused to be thrust against the upper lug or boss 60, and the mirror-release latch 48 is caused to turn in a clockwise direction until its motion is arrested by the cam arm 59 of the mirror latch 48 engaging the said upturned end 57. The said cam arm 59 of the latch 48 is so shaped, as shown in Figs. 6 and 7, that when the mirror-release or operating lever 37 is pressed downward against the lug 60, the upturned end 57 of said lever will cause said arm 59 of the mirror latch 48 to be turned in a contraclockwise direction against the tension of the coiled spring 53, thus releasing said mirror frame 46, which thereupon is caused to swing upward as previously described. The swinging up of the mirror frame 46 operates the shutter in a manner well known in the art, and such shutter operation need not be further described herein.

In order to restore the mirror 45 to the position shown in Fig. 1, there is provided a mirror-set lever attached to the mirror pivot shaft 47. The position of the said mirror-set lever corresponds to the position of the mirror frame 45 in Fig. 1. The mirror-set structure just described may be varied as desired in different applications or embodiments of my invention.

I will next describe the selected embodiment of means for coupling the motion of the mirror-release or operating lever and the diaphragm release mechanism, and for that purpose, I will refer mainly to Figs. 1, 2, 3, 5, 7 and 11.

In Figs. 2 and 3 is shown the mechanism for coupling the motion of the mirror-release or operating lever 37 and the diaphragm-release mechanism. At the inner face of the base of the camera box or casing 20, there is suitably mounted a transversely extending plate-like rocker-member 64 which is here shown as held to the base of the camera casing 20 by screws 65, 65 passing through holes in the said rocker-member 64, the said holes being sufficiently large to allow a slight rocking movement of the said rocker-member 64, which is also provided with a curved channel 66 to act as a pivot for its movement, as most clearly shown in Figs. 2, 3 and 7.

Attached to the said rocker-member 64 by means of a shoulder rivet 67, shown in Fig. 3, is an arm 68 attached to a second arm 69 by means of a shoulder rivet 70. As most clearly shown in Fig. 7, there are provided posts 71, 72 respectively attached to the said rocker-member 64. Attached to the post 72 is a flat spring member 73 (Fig. 3) by means of a screw 74. The spring member 73 is provided with a hole through which an adjusting screw 75 passes, as best shown in Fig. 11. The said post 71 is provided with a tapped hole into which is threaded the adjusting screw 75. The purpose of this structure just described is to permit the spring plate 73 to be adjusted with respect to the right hand end portion of the mirror latch 48 viewing Fig. 5.

As the mirror-release or operating lever 37 is depressed, the mirror latch 48 is caused to travel in a contraclockwise direction, thereby through its right hand end portion (viewing Fig. 5) releasing the mirror frame 46 and at the same time or very shortly thereafter (depending on the adjustment of the screw 75) the rocker-member 64 will be caused to rock on said rounded channel 66, carrying with it arm 68 and arm 69 (best shown in Figs. 3 and 7). The arm 69 is provided with an enlarged end 76 having a hole 77, best shown in Fig. 4.

Attached to the camera front 31 is a guide-member 78, shown in detail in Fig. 4 and also in Fig. 7. The portion of said guide-member that is attached to the camera front 31 is of a right angle shape. Extending from the angularly shaped portion of the guide member 78 is a horizontal extension 79, best shown in Fig. 4, a vertical extension 80 passing through the hole 77 of the arm 69, and also an upper horizontal extension 81. The presence of the said two horizontal extensions 79 and 81 is to limit the motion of the arm 69. Since the guide member 78 is attached to the camera front 31, the arms 68 and 69 are caused to be extended when the camera front 31 is moved outward and to be folded together when the said camera front is retracted. Fig. 2 shows the said arms 68, 69 when in an extended position, and Fig. 10 shows them in their collapsed or retracted condition. However, the arm 69 is free to move in a vertical direction within the limits just disclosed, regardless of the position of the camera front 31. This is necessary inasmuch as it is highly desirable to be able to operate the automatic diaphragm regardless of the position of the camera front 31.

Again referring to Fig. 3, there is attached to the lens-board 32 of the camera front 31 a bearing 82 through which passes a shaft 83 having attached to one end a diaphragm release catch 84. On the opposite end of said shaft 83 is a hub 85 clamped to said shaft 83 by means of a clamping screw 86. Staked or otherwise secured to the hub 85 is a second lever 87, shown in Fig. 3. The said lever 87 is caused to turn in a direction so as to contact with the large end 76 of the arm 69 by means of a spring 88, shown in Fig. 8. One end of the said spring 88 is hooked over lever 87 and the opposite end of said spring is hooked over a pin 89 attached to the lens board 32. The said spring 88 serves two purposes, the first being to move the diaphragm release catch 84 into position to hold the automatic diaphragm dog in the wide-open position, and the second being to return the operating mechanism after exposure has been made.

Referring to Fig. 2, wherein the bellows 24 is represented as extended, it is to be observed that the arms 68 and 69 have been extended or unfolded to a very considerable extent so that the distance has been increased between the shoulder rivet 67 and the enlarged end 76 of the lever 69. The mechanism has sufficient travel when in this position to operate or move the catch 84 to a considerably greater extent or by a considerably greater degree of movement than is necessary to effect the release of the automatic diaphragm dog when the operating parts are in such condition.

When the camera front 31 has been retracted or withdrawn into the camera as shown in Fig. 10, the distance between the shoulder rivet 67 and the enlarged end 76 of the arm 69 has been shortened considerably. Therefore, the travel of the automatic diaphragm catch 84 will be less than when the parts are in the position shown in Fig. 2. However, the mechanism is so adjusted by means of the adjusting screw 75 that the automatic diaphragm will be released when in this position, and of course the automatic diaphragm will be released when in the condition or position shown in Fig. 2.

I have decsribed the preferred mechanism for operating an automatic diaphragm, but without describing the structure of the automatic diaphragm itself.

The operating mechanism hereinbefore described is not permanently connected to the lens mount, and it is to be understood that such mechanism can be used for the operation of other devices or parts of the camera than an automatic diaphragm, as, for example, for the operation of a filter to swing or move in front of the lens after focusing has been done but before the exposure is made, or other auxiliary apparatus of a photographic camera may be connected to and operated by the said operating mechanism.

It is important to note that even with the automatic diaphragm control mechanism herein provided, the operation of the camera is not otherwise changed; that is to say, in order to make an exposure, the mirror-release lever 37 is depressed in the usual manner, this operation releasing the diaphragm as well as the mirror and requiring no thought on the part of the operator. It is further pointed out that in the disclosed construction the connecting means between the mirror-release lever and the diaphragm operating means are operable both when the camera front is in the infinity position and in the extended position.

When the mechanism is properly adjusted, the diaphragm release takes place just prior to the release of the mirror. However, as herein disclosed, and constituting the essence of my invention as claimed in this divisional application, this action can be adjusted over a wide range, and such invention is not limited to any particular time of release of the diaphragm with regard to the release of the mirror. The operator can release the diaphragm without releasing the mirror, by depressing the mirror release lever. He can also release the diaphragm by depressing the diaphragm release catch 84. In the event of releasing the diaphragm only, by means of the mirror-release lever, the operator should guard against over-travel which would release both mirror and shutter, thus inadvertently making an exposure.

With respect to the U-shaped latch 48, it is pointed out that heretofore such a latch has been used only for the release of the mirror of reflex cameras. In the present disclosure the said latch 48 is used to release both the automatic diaphragm and the mirror, and means for adjusting the time of the release of the diaphragm with respect to the release of the mirror has been provided as a vitally important feature of my invention.

The provision of the rocker-member 64 is important. The space in which the entire mechanism may be placed is necessarily very limited and the rocker-member 64 must be made rigid and yet it must be capable of moving very easily. Moreover, it must be exceedingly strong to carry the arm 68 pivoted thereto.

The spring plate 73 presents a novel and important structure in so far as its application to diaphragm-release or mirror-release mechanism is concerned, and the adjustment of said spring plate is an important feature of my present invention. The adjusting means provided therefor is accurate and sensitive, the screw 75 having a fine thread, making very accurate adjustment possible.

In the present disclosure all the mechanism is contained within the camera, and no part has been added to the outside of the camera excepting the mirror-release catch 84.

This is important because the camera design requirements now exclude all mechanism from the outside of the camera. Moreover, since all the mechanism is inside the camera, it is thereby protected from injury or misadjustments.

The entire structure or train of operating mechanism beginning with the point of pivotal connection of the arm 68 to the rocker-member 64, through to and including the lever 87, allows the camera to be operated regardless of the position of the lens with respect to the focal plane. The pivotal points provided at 67 and 70 for the arms 68, 69 permit the camera front 31 to be moved forward and back, but with the parts connected up; in other words, the rocker-member 64 remains connected to the diaphragm operating mechanism at all times.

Briefly set forth, the operation of my invention is as follows:

The mirror reset lever is pulled all the way back, thus setting the mirror frame 46 to the position shown in Fig. 1. The diaphragm-setting knob or handle is set in any one of the diaphragm stop holes opposite the diaphragm opening that is desired. The diaphragm ring-setting or opening-knob 94 is turned all the way in a contraclockwise direction until the dog is engaged by the latch 84. The diaphragm will now be in the "full opening" position. The camera is then focused in the usual manner by means of the focusing knob 23, and the exposure is made by applying pressure against the mirror-release or operating lever 37, which, just before the mirror 45 is released, releases the catch 84 from the said dog, as previously described, thus allowing the diaphragm to be closed to the position previously selected.

Having thus described one illustrative embodiment of the invention, it is to be understood that although specific terms are employed, they are used in a generic or descriptive sense, and not for purposes of limitation, the scope of the invention being set forth in the following claims.

I claim:

1. A reflex camera having a casing provided with a movable mirror, a lens board having a lens and having a diaphragm provided with means whereby it may be widely opened for focusing and be automatically stopped down to a predetermined smaller opening just prior to exposure, a member 37 constituting both a mirror-release member and a diaphragm-release member, a train of operating connections between said member 37 and both said mirror and said diaphragm for releasing them, there being included in said train of operating connections means for varying the timing action of said member with respect to its release of the mirror and its release of said diaphragm through said connections, such means for varying said timing action including an element in the said train of operating means with means to vary the position of said element and thereby to change the timing relation of the release of the mirror and the release of the diaphragm.

2. A reflex camera having a casing provided with a movable mirror, a lens board having a lens and having a diaphragm provided with means whereby it may be widely opened for focusing and be automatically stopped down to a predetermined smaller opening just prior to exposure, a member 37 upon the outside of the camera casing and constituting both a mirror-release and the diaphragm-release and a train of operating connections between said member 37 and both said mirror and said diaphragm for releasing them, there being manually adjustable means included in said train of operating connections, the adjustment of which means changes the time relation of the release of said mirror and the release of said diaphragm.

3. A reflex camera having a casing provided with a movable mirror, a lens board having a lens and having a diaphragm provided with means whereby it may be widely opened for focusing and be automatically stopped down to a predetermined smaller opening just prior to exposure, a movable mirror and diaphragm release member carried by the camera casing and accessible for manual manipulation, and a latch mounted for rocking movement in the camera casing and of substantially U-shaped form, thereby providing two portions, one of which is engaged by said release member, and a train of operating connections to said diaphragm, to release the latter, and including the second portion of the U-shaped latch, said second portion acting also to release the mirror.

4. A reflex camera having a casing provided with a movable mirror, a lens board having a lens and having a diaphragm provided with means whereby it may be widely opened for focusing and be automatically stopped down to a predetermined smaller opening just prior to exposure, a U-shaped latch mounted in the camera casing and presenting two operating portions, a mirror-release lever 37 mounted upon the casing to engage one of said portions and thereby operate said latch, and means including a spring plate 73 in the camera casing to be acted upon by said other portion of the U-shaped latch, whereby the movement of said latch also operates said diaphragm.

5. A reflex camera having a casing provided with a movable mirror, a lens board having a lens and having a diaphragm provided with means whereby it may be widely opened for focusing and be automatically stopped down to a predetermined smaller opening just prior to exposure, a U-shaped latch 48 mounted in the camera casing and presenting two operating portions, a mirror-release member 37 upon a casing wall to engage one of said portions and thereby move said latch, a spring plate 73 within the casing adapted to be moved by movement of said latch through the action of said other operating portion of said latch, and operating connections from said spring plate to said diaphragm.

6. A reflex camera having a casing provided with a movable mirror, a lens board having a lens and having a diaphragm provided with means whereby it may be widely opened for focusing and be automatically stopped down to a predetermined smaller opening just prior to exposure, a U-shaped latch 48 mounted in the camera casing and presenting two operating portions, a mirror-release member 37 upon a casing wall to engage one of said portions and thereby move said latch, a spring plate 73 within the casing adapted to be moved by movement of said latch through the action of said other operating portion of said latch, means to adjust the position of said spring plate, and operating connections from said spring plate to said diaphragm.

7. A reflex camera having a casing provided with a movable mirror, a lens board having a lens and having a diaphragm provided with means whereby it may be widely opened for focusing and be automatically stopped down to a predetermined smaller opening just prior to exposure, and means for releasing the diaphragm including the following parts, viz. a lever 37 mounted on an outer wall of the camera casing, a latch 48 carried by said camera casing and engaged by said lever 37, and an adjustable member 73 adapted to be acted upon by said lever 37 through said latch 48 and operatively connected to the diaphragm for releasing the diaphragm.

8. A reflex camera having a casing provided with a movable mirror, a lens board having a lens and having a diaphragm provided with means whereby it may be widely opened for focusing and be automatically stopped down to a predetermined smaller opening just prior to exposure, a mirror-release member 37 mounted upon the outside of the camera casing and a U-shaped latch 48 operated by said member 37 having two arms, one of which is engaged by said member 37, and the second of which acts to release the mirror and the diaphragm, and a train of operating connections from said second arm to said diaphragm.

9. A reflex camera having a casing provided with a movable mirror, a lens board having a lens and having a diaphragm provided with means whereby it may be widely opened for focusing and be automatically stopped down to a predetermined smaller opening just prior to exposure, manually operable means carried by the camera casing for releasing said diaphragm and also for releasing said mirror, and a train of operating connections from said manually operable means both to said mirror and to said diaphragm, to release them, said train including means for varying the timing action of said manually operable means, with respect to the release of said means and the release of said diaphragm.

10. A reflex camera having a casing provided with a movable mirror, a lens board having a lens and having a diaphragm provided with means whereby it may be widely opened for focusing and be automatically stopped down to a predetermined smaller opening just prior to exposure, manually operable means carried by the camera casing for releasing said diaphragm and also for releasing said mirror, means for varying the timing action of said manually operable means, with respect to the release of said means and the release of said diaphragm, said means for varying such timing action including the following parts, viz. the mirror latch 48, a spring member positioned to be engaged and moved by said latch, and means to adjust the position of said spring member and a train of operating connections from said spring member to said diaphragm.

11. A reflex camera having a casing provided with a movable mirror, a lens board having a lens and having a diaphragm provided with means whereby it may be widely opened for focusing and be automatically stopped down to a predetermined smaller opening just prior to exposure, manually operable means carried by the camera casing for releasing said diaphragm and also for releasing said mirror, means for varying the timing action of said manually operable means, with respect to the release of said means and the release of said diaphragm, said means for varying such timing action including the following parts, viz. the mirror latch 48, a spring plate member 73 adapted to be engaged and moved by said latch, and means to adjust the position of said spring plate member 73, there being a rocking member 64 mounted in the camera casing and operatively connected to the diaphragm release mechanism and also carrying said spring plate member 73.

12. A combination according to claim 3, but in which an element in said train of operating connections is adjustable in position with respect to said second portion of the U-shaped latch, for changing the time relation of the release of said mirror and the release of said diaphragm.

13. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a holding and a releasing latch 48 of U-shape, thereby providing two arms, said latch being mounted for rocking movement, one of said arms being acted upon by said release member and the other of said arms acting to release the mirror, and a train of operating connections from said second arm to the diaphragm to release the same.

14. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a holding and releasing latch 48 of U-shape, thereby providing two arms, a shaft 52 whereon said latch 48 is mounted for rocking movement, the first of said arms being positioned to be engaged by the said release member and the second of said arms being positioned to release the mirror and a train of operating connections between said second arm and the diaphragm to release the latter.

15. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a latch 48, a coiled spring 53 tending to rock said latch and having one end engaging said latch and the other end engaging said release member, said latch 48 having a part to hold and release said mirror, and a train of operating connections between the said latch and said diaphragm to release the latter.

16. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a latch 48, a coiled spring 53 tending to rock said latch and having one end engaging said latch and the other end engaging said release member, said latch 48 having a part to hold and release said mirror, and a train of operating connections between the said latch and said diaphragm to release the latter, said connections including a rocker member 64 having a plate-like spring member 73 attached thereto.

17. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a holding and releasing latch having a part to hold and to release the mirror, and operating connections between said latch and said diaphragm to release the latter, said operating connections including a rocker member 64 having a plate-like spring member 73 attached to it.

18. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a holding and releasing latch having a part to hold and to release the mirror, and operating connections between said latch and said diaphragm to release the latter, said operating connections including a rocker member 64, a post 72 attached to said rocker member, and a plate-like spring member attached to said post.

19. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a holding and releasing latch having a part to hold and to release the mirror, and operating connections between said latch and said diaphragm to release the latter, said operating connections including a rocker member 64, a post 72 attached to said rocker member, a plate-like spring member attached to said post, and means to adjust the spring member 73 with respect to said post.

20. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a holding and releasing latch having a part to hold and to release the mirror, and operating connections between said latch and said diaphragm to release the latter, said operating connections including a rocker member 64 having posts 71 and 72 attached thereto, and a plate spring 73 carried by the post 72 and adjustable with respect thereto.

21. A reflex camera having a casing provided with a movable mirror, a lens board having a lens and having a diaphragm provided with means whereby it may be widely opened for focusing and be automatically stopped down to a predetermined smaller opening just prior to exposure, a member constituting both a mirror release member and a diaphragm release member, a holding and releasing latch having a part to hold and to release the mirror, and operating connections between said latch and said diaphragm to release the latter, said operating connections including a rocker member 64 having posts 71 and 72 attached thereto, and a plate spring 73 carried by the post 72 and adjustable with respect thereto, the post 71 carrying a spring 75 for rendering said plate spring 73 adjustable.

OSCAR STEINER.